United States Patent
Coolen et al.

(10) Patent No.: US 6,207,599 B1
(45) Date of Patent: Mar. 27, 2001

(54) NONWOVEN BACKING AND CARPET COMPRISING SAME

(75) Inventors: Peter Thomas Coolen, Asheville; Samuel T. Johnson, III, Arden, both of NC (US)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/141,025

(22) Filed: Aug. 27, 1998

(51) Int. Cl.$^7$ ........................................ B32B 3/02
(52) U.S. Cl. ............... 442/242; 442/245; 442/254; 442/255; 442/263; 442/275; 442/277; 428/95
(58) Field of Search ................ 428/95; 442/242, 442/245, 254, 255, 263, 275, 277

(56) References Cited

U.S. PATENT DOCUMENTS

| | | | |
|---|---|---|---|
| 3,605,666 | * 9/1971 | Kimmel et al. | 112/410 |
| 3,817,817 | * 6/1974 | Pickens et al. | 161/67 |
| 3,895,151 | 7/1975 | Matthews et al. | |
| 3,940,302 | 2/1976 | Matthews | |
| 4,439,476 | * 3/1984 | Guild | 428/96 |
| 4,842,915 | 6/1989 | Hartmann et al. | |
| 5,284,097 | 2/1994 | Gillyns et al. | |
| 5,532,035 | * 7/1996 | Corbin et al. | 428/95 |
| 5,540,968 | * 7/1996 | Higgins | 428/95 |
| 5,578,648 | * 11/1996 | Beyer et al. | 521/45.5 |
| 5,654,066 | * 8/1997 | Pacione | 428/95 |
| 5,660,910 | 8/1997 | Hoyt et al. | |
| 5,962,101 | * 10/1999 | Irwin et al. | 428/92 |

FOREIGN PATENT DOCUMENTS

| | | |
|---|---|---|
| 822283 A2 | 2/1998 | (EP) . |
| 822284 A2 | 2/1998 | (EP) . |
| 59-137568 | 8/1984 | (JP) . |
| 3-241049 | 10/1991 | (JP) . |
| 4-352861 | 12/1992 | (JP) . |
| 4-352864 | 12/1992 | (JP) . |
| 4-352865 | 12/1992 | (JP) . |
| 5-71060 | 3/1993 | (JP) . |
| 6-128855 | 5/1994 | (JP) . |
| 9-291457 | 11/1997 | (JP) . |

OTHER PUBLICATIONS

Patent Abstracts of Japan, vol. 18, No. 319, Jun. 17, 1994, Abstract No. JP 06 072223 A.
Patent Abstracts of Japan, vol. 15, No. 293, Jul. 25, 1991, Abstract No. JP 03 104973 A.
Patent Abstracts of Japan, vol. 17, No. 211, Apr. 26, 1993, Abstract No. JP 04 352861 A.
Patent Abstracts of Japan, vol. 18, No. 430, Aug. 11, 1994, Abstract No. JP 06 128855 A.
Database WPI, Section Ch, Week 198832, Abstract No. XP002131616.

* cited by examiner

*Primary Examiner*—Terrel Morris
*Assistant Examiner*—Norca L. Torres
(74) *Attorney, Agent, or Firm*—Oliff & Berridge, PLC

(57) ABSTRACT

A nonwoven primary carpet backing includes thermoplastic polymer filaments or fibers bonded by means of a binder polymer. The backing includes at least a distinguishable thermoplastic woven layer, a distinguishable thermoplastic continuous layer, or a distinguishable nonwoven layer including filaments or fibers bonded by means of a binder polymer, which layer reduces the delamination strength of the backing, measured in accordance with DIN 54310, by at least 30% and preferably by at least 50%, with respect to the same backing without the distinguishable layer. Although the breaking strength of the untufted backing according to the invention is lower than that of untufted backings not including the distinguishable layer, the tufted backing according to the invention actually has a higher breaking strength and elongation than tufted backings not including the distinguishable layer.

16 Claims, 1 Drawing Sheet

NONWOVEN BACKING AND CARPET COMPRISING SAME

BACKGROUND OF THE INVENTION

1. Field of Invention

The present invention pertains to a nonwoven primary carpet backing. More particularly, the present invention pertains to a nonwoven primary carpet backing comprising thermoplastic polymer filaments or fibers bonded by means of a binder polymer.

2. Description of Related Art

The manufacture of nonwoven primary carpet backings, with filaments or fibers of a thermoplastic polymer being bonded with the aid of, e.g., a thermoplastic polymer bonding agent, has been known for many years. For example, such manufacture is disclosed in U.S. Pat. No. 4,842,915. This patent relates to a spunbonded fabric consisting of polyester matrix filaments, which fabric is suitable to be used as a tufting base for carpets. The fabric is strengthened by means of a binding component in the form of softenable filaments, fibers, a powder and/or fine-grained granulates. The binding component consists of polypropylene with a melting range which is at least 90° C. below the melting range of the polyester matrix filaments or fibers.

Over the years, nonwoven primary carpet backings have been constantly improved in order to meet the ever more stringent demands of carpet manufacturers and consumers. Of particular importance are: increasing the breaking strength and elongation at break after tufting, increasing the tear resistance after tufting and coating, generally improving the appearance of the resulting carpet, allowing effective mending of imperfections that occur during tufting, and facilitating tuftability, i.e. by providing lower tuft-needle penetration resistance and reduced needle deflection during tufting, avoiding rough back stitch, increasing stitch lock, and reducing noise during tufting.

In general, tufting reduces the breaking strength of nonwoven backings, particularly of high initial breaking strength) nonwoven backings, because of the disruption and/or damage caused by the tufting needles.

It is noted that European patent application no. EP 822283 concerns a spunbonded web comprising two types, (a) and (b), of bicomponent sheath/core filaments having a polyethylene terephthalate core which has a melting temperature higher than that of the sheath of binding polymer. The ratio by weight of the sheath polymer of the type (a) filament to the type (b) filament is in the range from 1:3 to 1:10. Over the cross-section of the web, the ratio by weight of type (a) filaments to type (b) filaments varies from 15 to 70%. This latter ratio changes through the cross-sectional planes of the web without any noticeable or distinguishable phase boundaries so as to avoid delamination. This technology, therefore, runs counter to that of the present invention, which seeks to promote delamination.

Japanese patent application JP 04-352861 concerns a nonwoven fabric composed of composite long fibers A of a polymer (a1) and a polymer (a2) having a melting point at least 30° C. higher than that of polymer (a1), and composite long fibers B of a polymer (b1) and a polymer (b2) having a melting point at least 30° C. higher than that of polymer (b1). Further, the melting point of polymer (b1) is at least 20° C. higher than that of polymer (a1). The fabric consists of four layers, the first containing only fibers A, the second containing more fibers A than fibers B, the third containing more fibers B than fibers A, and the fourth containing only fibers B. The concentration of fibers A and fibers B varies continuously without any clear boundaries, so that no delamination occurs.

U.S. Pat. No. 3,940,302 discloses a nonwoven web, suitable for use as a primary backing for tufted carpets. The nonwoven web contains bicomponent filaments having a core of polypropylene and a sheath of copolyamide that is described in the patent as "which is capable of being rendered adhesive in pressurized saturated steam at a pressure which leaves the core component substantially unaffected", together with polypropylene homofilaments. Parallel yarns are embedded in the web in its lengthwise direction. In a preferred embodiment, the bicomponent filaments are present in a higher concentration in a thin layer at at least one of the surfaces of the product than in the center of the product so as to improve the dye uptake of the surface of the backing.

JP 09-291457 concerns a laminate comprising web layers of a composite long fiber of the side-by-side type or the sheath/core type composed of two kinds of polymers with different melting points, i.e. high-density polyethylene and high-density polypropylene. The amount of high density polyethylene is different in each web layer. The laminate has super bulkiness, feel, and tensile strength.

JP 06-128855 discloses a three layer structure nonwoven fabric comprising a surface layer, an intermediate layer, and a backside layer. The surface layer and the backside layer are composed of a conjugate type long fiber consisting of a thermoplastic polymer component A and a thermoplastic polymer component B that is incompatible with the thermoplastic polymer component A. The long fibers are bonded by the fusion bonding of component A. The intermediate layer contains fiber A, consisting of only fiber A, and fiber B, consisting of only fiber B, which fibers are formed by dividing the conjugate type long fiber. Fiber A is entangled with fiber B without substantially being fused.

SUMMARY OF THE INVENTION

It is an object of the present invention to provide the above-described improvements. This is achieved in the carpet backings of the present invention, wherein the backing is a multi-layer structure comprises at least a distinguishable thermoplastic woven layer, a thermoplastic continuous layer, or a nonwoven layer comprising filaments or fibers bonded by means of a binder polymer. The distinguishable layer of the present invention reduces the delamination strength of the backing, measured in accordance with DIN 54310, by at least 30 per cent, preferably at least 50 per cent, with respect to the same backing without the said distinguishable layer.

It has been found that a decrease in delamination strength achieved through incorporation of the distinguishable layer of the present invention, either as a substitute for an existing layer or as an additional layer, resulted in a substantial decrease in tensile breaking strength of the backing, which decrease at first may seem disadvantageous. However, it appeared that the deliberate reduction in breaking strength in accordance with the present invention (i.e. by decreasing the delamination strength of the backing) suppresses the reduction in breaking strength and elongation resulting from tufting. Although the breaking strength of the untufted backing according to the invention is lower than that of untufted prior art backings, the tufted backing according to the invention actually has a higher breaking strength and elongation than tufted prior art backings. This phenomenon will be illustrated and substantiated by the examples hereinbelow.

The distinguishable layer according to the present invention is responsible for the reduction of the delamination strength (e.g., through higher mobility of the filaments or fibers and/or by reduced adherence to the other layer(s)), and also provides sufficient coherence of the laminate to allow handling, particularly rough handling, and processing. The distinguishable layer according to the present invention can take many forms, such as a dry-laid, a wet-laid, or a meltblown nonwoven. Other examples of forms that the distinguishable layer according to the present invention can take are woven fabrics and continuous layers such as a film or foil. However, thermally or chemically bonded nonwovens, such as spunbonded nonwovens, which may in addition be needlepunched or hydro-entangled, are preferred.

DETAILED DESCRIPTION OF PREFERRED EMBODIMENTS

The present invention is directed to a nonwoven primary carpet backing. As described above, the nonwoven primary carpet backing is a multi-layer structure comprising at least a distinguishable layer. The distinguishable layer is selected from a thermoplastic woven layer, a thermoplastic continuous layer, or a nonwoven layer, comprising filaments or fibers bonded by means of a binder polymer. The distinguishable layer of the present invention reduces the delamination strength of the backing, measured in accordance with DIN 54310, by at least 30 per cent, preferably at least 50 per cent, with respect to the same backing without the said distinguishable layer.

The term "distinguishable" is used herein to refer to the layer of the prepared according to the present invention. This term indicates that, although some mixing and/or interlocking of the filaments or fibers in the different layers cannot be avoided in nonwovens, the transition from one layer to the next is essentially not gradual. It is preferred that each of the layers is substantially homogeneous (i.e., exhibits no large gradients in composition over its thickness) and/or consists of a single type of filaments or fibers or a homogeneous blend of more than one type of filaments or fibers.

Within the framework of the present invention, primary carpet backings consisting of two distinguishable layers are a viable option, but it is preferred that the layer that is responsible for the reduction in delamination strength is embedded in the backing, such as in the form of an inner layer between outer layers of the multilayer carpet backing, which thus comprises at least three distinguishable layers (i.e., the distinguishable layer of the present invention located between the two outer layers). In such a structure, the outer layers can move relative to one another (locally), which helps holding of tufted yarn, and provides the required stability and other mechanical properties of the backing.

Figure 1:
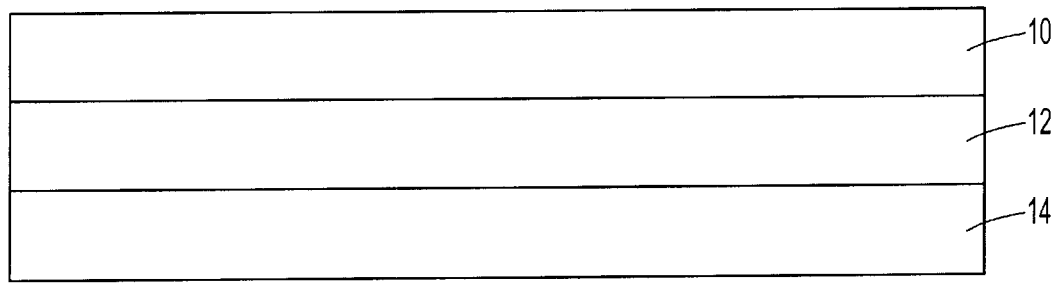
FIG. 1 is a cross-sectional view of a primary carpet backing according to the present invention.
Figure 2:
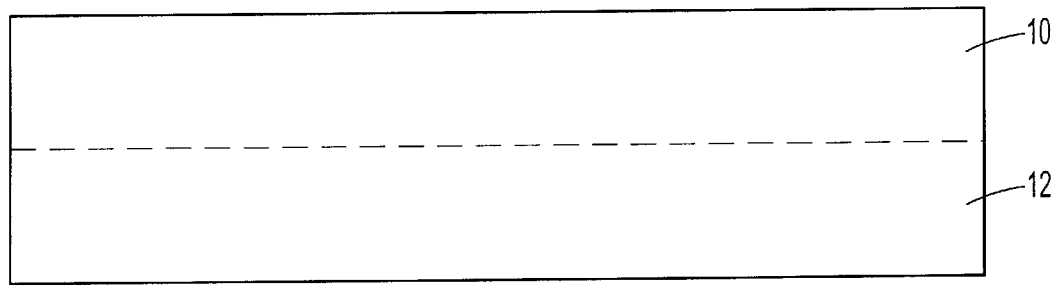
FIG. 2 is a cross-sectional view of a primary carpet backing according to the prior art.

Such a multilayer primary carpet backing is shown in cross-section in FIG. 1. In FIG. 1, layers 10 and 14 represent the outer layers of a primary carpet backing, with a distinguishable layer 12 according to the present invention sandwiched therebetween. If the distinguishable layer of the present invention were omitted, as in the prior art, the result would be the structure shown in FIG. 2. FIG. 2 shows the primary carpet backing as having pseudo-layers 10 and 12 without the embedded distinguishable layer 12. The layers 10 and 12 are separated by a dashed line to denote that they are indistinguishable from each other, as having the same composition. With reference to the Examples, described, below, FIG. 1 corresponds to the Examples of the present invention, while FIG. 2 corresponds to the control Examples.

It is also preferred that the backing is thermally bonded and that each of the layers comprises a binder polymer, preferably a thermoplastic binder polymer, and filaments or fibers of a thermoplastic polymer. According to the present invention, the concentration of the binder polymer in the layer responsible for the reduction in delamination strength, i.e., in the distinguishable layer, is at least 20, preferably at least 30 per cent lower than that of the binder polymer in the other layer or layers. The reduction in "concentration" of binder polymer in a layer can be achieved in various ways, for instance by employing sheath/core filaments or fibers with a lower sheath/core ratio or by blending in less "bonding filament" or "bonding fiber".

Alternatively, or in addition, according to the present invention, the bonding temperature of the binder polymer in the layer responsible for the reduction in delamination strength, i.e., of the distinguishable layer, is at least 4° C., preferably at least 6° C. higher than that of the binder polymer in the other layer or layers. By providing a lower degree of bonding, the delamination strength is effectively reduced and holding of the tufted yarn, also referred to as "stitch lock" or "stitch holding," is further enhanced owing to the greater mobility of the filaments or fibers in the said layer.

The aforementioned bonding temperature is the temperature at which the binder polymer melts and/or softens and bonding points between contacting filaments or fibers are established. This bonding temperature can be manipulated in various ways, e.g., by selecting a binder polymer that has a different melting temperature and/or Melt Flow Index or melt viscosity.

Alternatively, selecting a binder polymer which, to a carefully selected degree, is incompatible with the binder polymer in the adjacent layer(s) will reduce bonding to the said layer(s). This also will result in a lower delamination strength.

The melting or softening temperature of the binder polymer is preferably 15 to 20° C. lower than that of the filaments or fibers, but in some polymer combinations a smaller difference may be advisable or even essential. As used herein, the melting temperature is measured with the generally known DSC (Differential Scanning Calorimetry) technique. According to this technique, a specimen of about 5 mg, which is in a nitrogen atmosphere, is heated at a rate of 10° C. per minute. The peak temperature of the melt endotherm obtained using this DSC technique is referred to herein as the "melting temperature."

The filaments or fibers according to the present invention may also be in the form of bicomponent filaments or fibers. "Bicomponent filaments or fibers" means that the binder polymer is part of the filaments or fibers (with the binder polymer preferably forming at least part of the outer surface of the filaments or fibers). When the filaments or fibers are in the form of bicomponent filaments or fiber, the binder polymer will be homogeneously distributed throughout the as yet unbonded nonwoven as the filaments or fibers are laid. Because of this homogeneous distribution, there will be bonding agent at (virtually) all points where the filaments or fibers come into contact. As a result, there will be a large number of bonding points and, in addition, the guarantee of an effective supply of bonding agent to the points of contact during the thermal bonding process.

Bicomponent fibers and filaments, or fibers of the core/sheath or the side-by-side type in particular, are highly suited to be used in the nonwovens according to the present invention.

Another very suitable method for adding the bonding agent to the thermoplastic filaments or fibers according to the present invention is by using a "bonding filament" or "bonding fiber." By "bonding filament" or "bonding fiber" is meant a fiber or filament that is made up entirely or for the most part of the binder polymer. These bonding filaments or bonding fibers are laid together with the other filaments or fibers, so that here also a homogeneous distribution of the bonding agent throughout the as yet unbonded nonwoven is obtained. Such a nonwoven is sometimes referred to as a "bifilament nonwoven."

For that matter, the present invention is not restricted to the forms of the binder polymer described above. Rather, it is also possible for the bonding agent to be added to the unbonded filaments or fibers in the form of, e.g., a powder, an emulsion, or as fibrids.

Examples of polymers and copolymers that are highly suitable for use as a binder polymer in the nonwoven according to the present invention are polyamide 6, copolyamides, copolyesters, polypropylene, copolypropylene, polyethylene, and mixtures of one or more of these materials. An example of another suitable material is polybutylene terephthalate. The binder may also be added in the form of monomers that are cured (i.e., polymerized) during bonding.

Amongst others, polyester is highly appropriate for the thermoplastic filaments or fibers in embodiments of the present invention. Further suitable materials include, but are not restricted to, polyamide 6, polyamide 46, polyamide 66, copolyamides, and copolyesters.

If the layer responsible for the reduction in delamination strength, i.e., the distinguishable layer, is a nonwoven layer, then the volume ratio of the binder polymer to the filament or fiber forming polymer is preferably lower than 20:80, more preferably lower than 15:85. In the other nonwoven layer or layers, i.e., the layer or layers other than the distinguishable layer of the present invention, the said ratio is preferably within the range from 20:80 to 50:50, more preferably in the range from 20:80 to 35:65.

The linear density of the filaments or fibers is preferably in a range from 1 to 25 dtex, preferably 5 to 20 dtex. At a linear density below about 1 dtex, the nonwoven material is rather dense, especially at higher basic weights, resulting in more damage to the backing and an increased number of needle deflections during tufting. At a linear density in excess of about 25 dtex, the nonwoven material is very "open," especially at lower basic weights, and stitch holding is reduced.

The total basic weight of the carpet backings according to the present invention is preferably at least 50 $g/m^2$, more preferably at least 70 $g/m^2$. It is further preferred that the basic weight of the layer responsible for the reduction in delamination strength, i.e., the distinguishable layer, is less than 50 per cent, more preferably less than 40 per cent, of the total basic weight of the carpet backing.

Although the delamination strength of the backing of the invention is defined relative to backings that do not contain the distinguishable layer described above, either as a substitute for an existing layer or as an additional layer, it is usually preferred that the delamination strength, measured in accordance with DIN 54310 is lower than 6 N.

The present invention further pertains to a carpet comprising the nonwoven backing described above. Such a carpet exhibits increased strength and elongation and is more even.

EXAMPLES

All samples in the following Examples were spunbonded using commonly known technology for depositing three separate layers of filaments on top of each other on a collector surface. In each sample, the basic weight of the backings amounted to 120 $g/m^2$. The filaments were all of the sheath/core type, having a polyethylene terephthalate core and a polyamide 6 sheath. After deposition the samples were thermally bonded.

Samples 1a and 1b were prepared as controls. Samples 1a and 1b consisted of three identical layers, each having a basic weight of 40 $g/m^2$ and consisting of filaments having a 26/74 sheath/core volume ratio and a linear density of 9 dtex.

Samples 2a and 2b were prepared in accordance with the present invention. Samples 2a and 2b consisted of two identical outer layers of filaments having a 26/74 sheath/core volume ratio and an inner layer of 10/90 sheath/core volume ratio. All filaments had a linear density of 9 dtex and all three layers had a basic weight of 40 $g/m^2$.

Sample 3 was also prepared in accordance with the present invention. Sample 3 consisted of two identical outer layers, each having a basic weight of 36 $g/m^2$ and consisting of filaments having a 26/74 sheath/core volume ratio and a linear density of 9 dtex, and an inner layer having a basic weight of 48 g/m² and consisting of filaments having a 10/90 sheath/core volume ratio and a linear density of 6 dtex.

Samples 1a and 2a were produced at a lower bonding temperature than samples 1b, 2b, and sample 3.

In each of the samples 1a, 1b, 2a, 2b, and 3, the following properties of the samples were determined:
1) Breaking strength and elongation at break before tufting, measured in accordance with DIN 53857-2;
2) Breaking strength and elongation at break after tufting, measured in accordance with ASTM D2646;
3) Delamination strength, measured in accordance with DIN 54310; and
4) Appearance, based on the scores of ten experts, by which the tufted samples were qualified as "even" or "uneven."

TABLE 1

Properties before tufting

| Sample | Strength (MD/CMD)/2 in N/5 cm | Elongation (MD/CMD)/2 in % | Delamination Strength in N |
| --- | --- | --- | --- |
| 1a control | 334 | 22 | 7.4 |
| 1b control | 324 | 22 | 11.6 |
| 2a invent. | 194 | 11 | 2.3 |
| 2b invent. | 203 | 12 | 4.0 |
| 3 invent. | 166 | 9 | 5.3 |

TABLE 2

Properties after tufting

| Sample | Strength (MD/CMD)/2 in lbs | Elongation (MD/CMD)/2 in % | Appearance |
| --- | --- | --- | --- |
| 1a control | 112 | 65 | uneven |
| 1b control | 105 | 64 | uneven |
| 2a invent. | 138 | 76 | even |
| 2b invent. | 136 | 72 | even |
| 3 invent. | 144 | 73 | even |

These experiments clearly show that, although the backings in accordance with the present invention have reduced strength and elongation before tufting when compared to the control backing, they exhibit considerably improved strength and elongation after tufting when compared to the control backing. That is, the data in Tables 1 and 2 shows that although the backings in accordance with the present invention have a 35 to 60% lower strength and elongation before tufting when compared to the control backing (see Table 1), they exhibit a considerably improved, up to approximately 40% higher, strength and elongation after tufting when compared to the control backing.

Also, the appearance of carpets produced with the backings according to the present invention are much more even than carpets produced with the controls.

What is claimed is:

1. A nonwoven primary carpet backing comprising:
   a first layer comprising thermoplastic polymer filaments or fibers bonded by means of a binder polymer,
   a second layer, wherein said second layer is a distinguishable layer selected from the group consisting of (a) a distinguishable thermoplastic woven layer, (b) a distinguishable thermoplastic continuous layer, and (c) a distinguishable nonwoven layer also comprising filaments or fibers bonded by means of a binder polymer, and
   a third layer, such that said second layer is embedded in the backing between the first layer and the third layer, such that said second layer is distinguishable from said first and third layers,
   wherein the distinguishable layer reduces the delamination strength between layers of the backing, measured in accordance with DIN 54310, by at least 30% with respect to a similar multi-layer backing without the distinguishable layer.

2. The nonwoven backing according to claim 1, wherein the distinguishable layer reduces the delamination strength between layers of the backing, measured in accordance with DIN 54310, by at least 50% with respect to a similar multi-layer backing without the distinguishable layer.

3. The nonwoven backing according to claim 1, wherein each of the first and second layers comprises thermoplastic polymer filaments or fibers thermally bonded by means of a binder polymer and wherein a concentration of the binder polymer in the second layer is at least 20% lower than a concentration of the binder polymer in the first layer.

4. The nonwoven backing according to claim 1, wherein each of the first and second layers comprises thermoplastic polymer filaments or fibers thermally bonded by means of a binder polymer and wherein a concentration of the binder polymer in the second layer is at least 30% lower than a concentration of the binder polymer in the first layer.

5. The nonwoven backing according to claim 1, wherein each of the first and second layers comprises thermoplastic polymer filaments or fibers thermally bonded by means of a binder polymer and wherein a bonding temperature of the binder polymer in the second layer is at least 4° C. higher than a bonding temperature of the binder polymer in the first layer.

6. The nonwoven backing according to claim 1, wherein each of the first and second layers comprises thermoplastic polymer filaments or fibers thermally bonded by means of a binder polymer and wherein a bonding temperature of the binder polymer in the second layer is at least 6° C. higher than a bonding temperature of the binder polymer in the first layer.

7. The nonwoven backing according to claim 1, wherein each of the first and second layers comprises thermoplastic polymer filaments or fibers thermally bonded by means of a binder polymer and wherein:
   a concentration of the binder polymer in the second layer is at least 20% lower than a concentration of the binder polymer in the first layer, and
   a bonding temperature of the binder polymer in the second layer is at least 4° C. higher than a bonding temperature of the binder polymer in the first layer.

8. The nonwoven backing according to claim 1, wherein each of the first and second layers comprises thermoplastic polymer filaments or fibers thermally bonded by means of a binder polymer and wherein:
   a concentration of the binder polymer in the second layer is at least 30% lower than a concentration of the binder polymer in the first layer, and
   a bonding temperature of the binder polymer in the second layer is at least 6° C. higher than a bonding temperature of the binder polymer in the first layer.

9. The nonwoven backing according to claim 1, wherein the binder polymer in at least one of the first and second layers forms at least part of the outer surface of the filaments or fibers.

10. The nonwoven backing according to claim 9, wherein the filaments or fibers are in the form of sheath/core filaments or fibers wherein the binder polymer forms the sheath.

11. The nonwoven backing according to claim 1, wherein the binder polymer in at least one of the first and second layers is selected from the group consisting of polyamide 6, copolyamides, polybutylene terephthalate, copolyesters, polypropylene, copolypropylene, polyethylene, and mixtures of one or more of these materials.

12. The nonwoven backing according to claim 1, wherein the thermoplastic polymer building the filaments or fibers in at least one of the first and second layers is selected from the group consisting of polyester, polyamide 6, polyamide 46, polyamide 66, copolyamides, and copolyesters.

13. The nonwoven backing according to claim 1, wherein a linear density of the filaments or fibers is in the range from 1 to 25 dtex.

14. The nonwoven backing according to claim 1, wherein a linear density of the filaments or fibers is in the range from 5 to 20 dtex.

15. The nonwoven backing according to claim 1, wherein a delamination strength between layers of the nonwoven backing is lower than 6 N.

16. Carpet comprising the nonwoven primary backing according to claim 1.

* * * * *